Dec. 22, 1964  H. A. BARTH  3,162,555
METHOD FOR HEAT TREATING WELDED METAL PLATES
Filed Feb. 19, 1962

United States Patent Office 3,162,555
Patented Dec. 22, 1964

3,162,555
METHOD FOR HEAT TREATING WELDED METAL PLATES
Heinz Alfred Barth, Pullach, near Munich, Germany, assignor to Gesellschaft fur Linde's Eismaschinen Aktiengesellschaft, Hollriegelskreuth, near Munich, Germany, a company of Germany
Filed Feb. 19, 1962, Ser. No. 174,224
Claims priority, application Germany, July 9, 1958, G 24,879
2 Claims. (Cl. 148—145)

This invention relates to a method of, and apparatus for, heat-treating metal and more especially normalizing a welding groove or weld seam in a workpiece or structural part formed from a steel exhibiting an $Ac_3$ characteristic upon heating.

As is known, the structure of the workpiece material in the vicinity of the welded seam and in the welding material itself is changed by the welding process. Thus, the welding material and the surrounding zones of the workpiece assume different ductility properties than those characterizing the material of the workpiece at zones unaffected by the welding operation. Consequently, there is a danger of rupture. Particularly critical are the conditions in those workpieces and structural parts which are, in later use, exposed to low— particularly extremely low—temperatures such as the tanks and other apparatus of a low-temperature plant for liquefying and separating gases. The change of the material structure is particularly annoying when structural materials, such as steels, are used which have received the necessary ductility properties by a preceding heat-treatment, particularly tempering.

It is known in the art that normalizing steel involves heating the steel above its critical $Ac_3$-range to transform the structure to austenite, following by cooling in still air. A normalizing treating can be used to reduce stresses from a cooled weld piece and to remove hardened zones adjacent to the weld; also, to create a more uniform and desirable micro-structure in both the weld metal and the base metal. Normalizing treatment differs from a mere stress-relieving heat treatment both in respect to the temperature to which the steel is subjected and in respect to the structural changes effected in the metal so heat-treated. Temperatures used for relieving stresses in steels having an $Ac_3$ characteristic are basically lower by some 100° C. than are the temperatures necessary for effecting normalization of the same steel, and range generally between 600° C. and 650° C. in case of steels having said $Ac_3$ characteristics, e.g., steels having a carbon content of less than 0.9% by wt. Contrary thereto, in normalization a temperature of 900° C. or above is reached, the temperature varying with the carbon content and being higher than the $Ac_3$-temperature.

The direct effect of the dissimilar heat treatments becomes apparent in the structure of the heat-treated steel. In normalization a change takes place in the crystalline structure, whereas heat treatment at 600–650° C. leads solely to the elimination of mechanical stresses in the metal adjacent the welding seam while the crystalline structure remains unaffected.

While general "rules" heretofore have been suggested regarding the lateral limitations of the heated zone in the case of stress-relief through heat treatment, so far as applicant is aware no such lateral limitations heretofore had been suggested in respect of normalization treatment.

It is, accordingly, among the objects of this invention to provide an improved and novel method of heat-treating welded seams, in workpieces and structural parts formed from a steel of the aforesaid sort, whereby only a certain portion is subjected to the heat of normalization dependent upon the thickness of the workpiece. Another object of this invention is an apparatus for regulating and/or piloting the heat-treating operation.

The invention will now be described more specifically and in connection with the accompanying drawing, in which.

Figure 1:
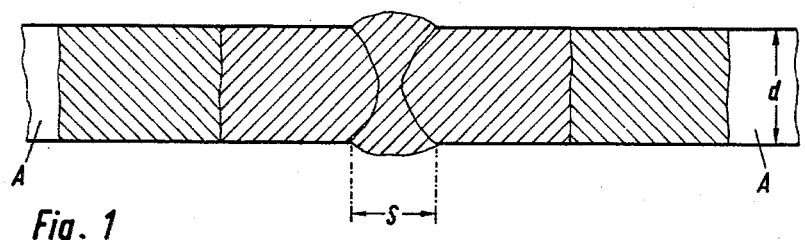
FIG. 1 is a cross-section through a steel workpiece showing the welded seam and the bands to be normalized for a special case.

In FIG. 1, "A" designates a part of a workpiece of heat-treated steel. The range of the welding groove (weld seam) is indicated by "S." The total range of the zone to be included in the heat-treatment range is hatched in two ways. The total hatched range is maximally five times the thickness $d$ of the workpiece, and the temperature in this range is above 600° C. Designated with different hatching is an inner range in the form of a band whose width is 2 to 3 times the thickness $d$ of the workpiece (in FIG. 2 the band-width is shown as being equal to $2.5d$) which is the zone to be heated above a temperature corresponding to the $Ac_3$-point of the steel. Thus during normalizing treatment of the weld three temperatures can be realized in the workpiece, viz:

(1) A temperature above the $Ac_3$-point corresponding to the inner band including the weld seam or welding groove. This temperature alters the crystallic structure of the metal;

(2) A temperature between 620° C. and the $Ac_3$-point. This temperature does not alter the crystallic structure of the metal but removes stresses in the crystallic structure; and (3) The range of the workpiece which has a temperature below 620° C. This temperature does not alter the structure of the workpiece in any way. Therefore, the workpiece in this range has the original structure before welding.

The heat-treatment can be effected, for example, by means of a burner or inductive heating.

Figure 2:
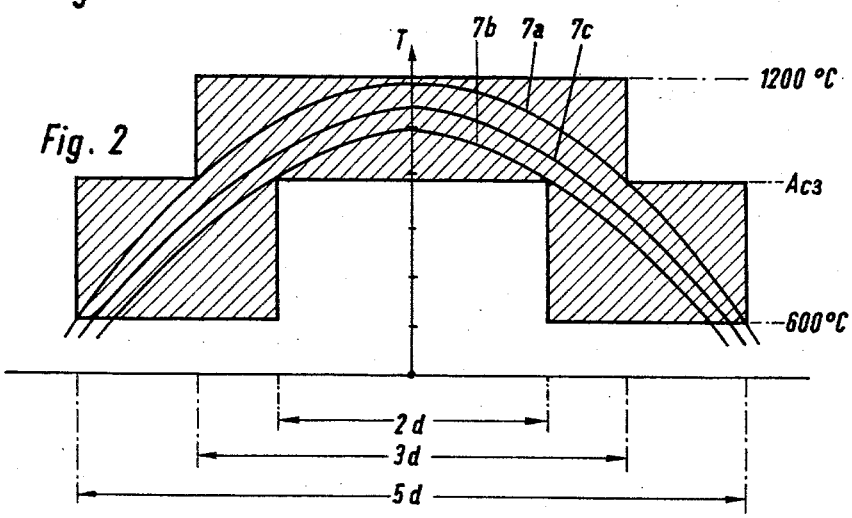
FIG. 2 is a graph showing temperature as a function of distance from the middle of the welded seam.

FIG. 2 illustrates the heat distribution in the workpiece. There is shown the inner band which has a width of $2d \ldots 3d$, and the outer bands, the outer sides of which have a distance from the center corresponding to $5d$. The local temperature distribution is represented by a maximum curve $7a$ and a minimum curve $7b$. Obtaining a certain temperature- distributing curve is accomplished by cooling the workpiece in a band of a certain distance on both sides of the weld seam. The cooling should be made controllable and known methods for cooling can be provided.

Figure 4:
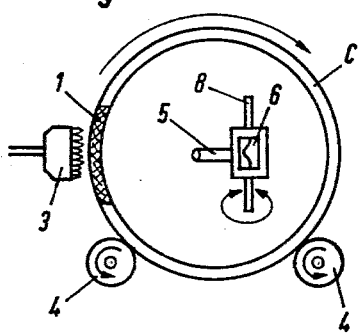
FIG. 4 is a cross section of the boiler of FIG. 3 with transport-rolls added, during normalizing a circumferential welded seam therein.
Figure 3:
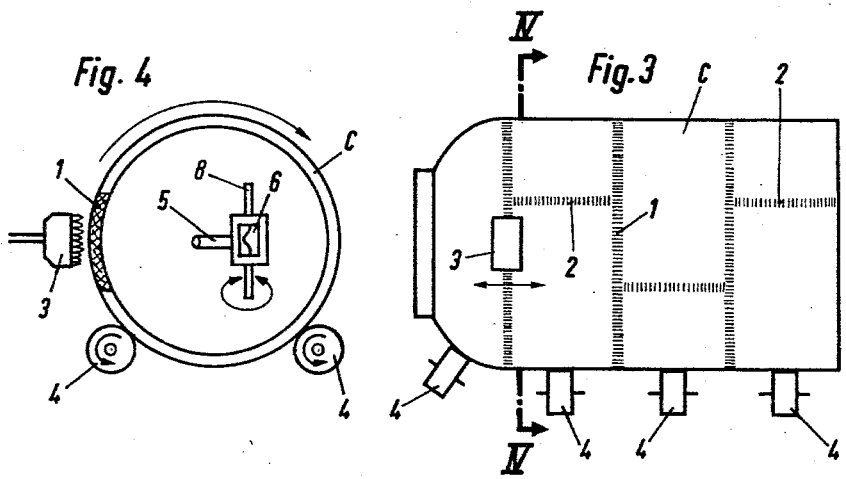
FIG. 3 is a side view of a boiler formed of steel plates joined by means of several welded seams.

In FIG. 3 there is shown a boiler C with circumferential welded seams 1 and horizontally welded seams 2 joining the steel plates from which the boiler had been constructed. FIG. 4 shows normalizing of a circumferential welded seam 1 by means of a burner 3.

The boiler is rotatably supported on horizontally slidable rollers 4, 4. During normalizing the container is turned about its cylinder axis by conventional rotating means (not shown). On the inner side of the boiler C, which is not heated by the burner 3, a heat radiation measuring instrument 5 is provided, which receives radiation from the welded seam 1. This instrument 5 is oscillated back and forth about an axis 8 vertically to the welded seam 1, so that it can receive heat radiation from all parts of the seam 1 and immediately adjacent metal in a band approximately five times as wide as the workpiece is thick. Also the instrument 5 is connected to a recording apparatus 6 which at each time interval shows the present local temperature distribution of FIG. 2, for instance, a curve 7c.

In case the curve 7c does not lie in the desired range hatched in FIG. 2, it is possible to accelerate or decelerate the transmission of the workpiece. In a similar way the horizontal weld seams 2 are normalized either by horizontally moving the burner 3 or the slidable rolls 4.

In another form of the invention, the rollers 4 are cooled in a known manner, for instance, water-cooled, and the distance from these rollers to the welded seam can be altered. In this way it is possible to regulate the local heat distribution curve. Alternatively, cooling may be effected by jetting a fluid coolant upon the metal adjacent to the heat-treatment band.

This application contains subject matter in common with my co-pending application Serial No. 825,276 and is a continuation-in-part of the latter.

I claim:

1. A method of normalizing welded plates of steel exhibiting an $Ac_3$ characteristic upon heating wherein a welded seam and a primary band on both sides of the welded seam are heated to a temperature above the $Ac_3$-point and two secondary bands adjoining said primary band on both sides are heated to a temperature below the $Ac_3$-point, which comprises exposing the welded seam and the adjacent bands to a heat source thereby heating the welded seam and said primary band to a temperature above the $Ac_3$-point and the two secondary bands to a temperature below $Ac_3$-point, and effecting progressive relative movement between said welded plate and said heat source to form a primary band which ranges in width from two to three times the thickness of the plate and the total width of said primary and said secondary bands is maintained at a maximum at five times the thickness of the plate.

2. A method as defined in claim 1, which includes the step of cooling the plate metal and both sides of said combined primary and secondary bands thereby limiting the total width of the heated area at the maximum to five times the thickness of the plate.

References Cited in the file of this patent

UNITED STATES PATENTS

| | | |
|---|---|---|
| 2,089,014 | Bucknam et al. | Aug. 3, 1937 |
| 2,122,941 | Hufler et al. | July 5, 1938 |
| 2,416,161 | Deck | Feb. 18, 1947 |
| 2,564,391 | Burns | Aug. 14, 1951 |

OTHER REFERENCES

Welding Metallurgy, 2nd Edition, 1949, by O. H. Henry et al. (pages 270–274, and 289 relied upon).